United States Patent Office 3,409,109
Patented Nov. 5, 1968

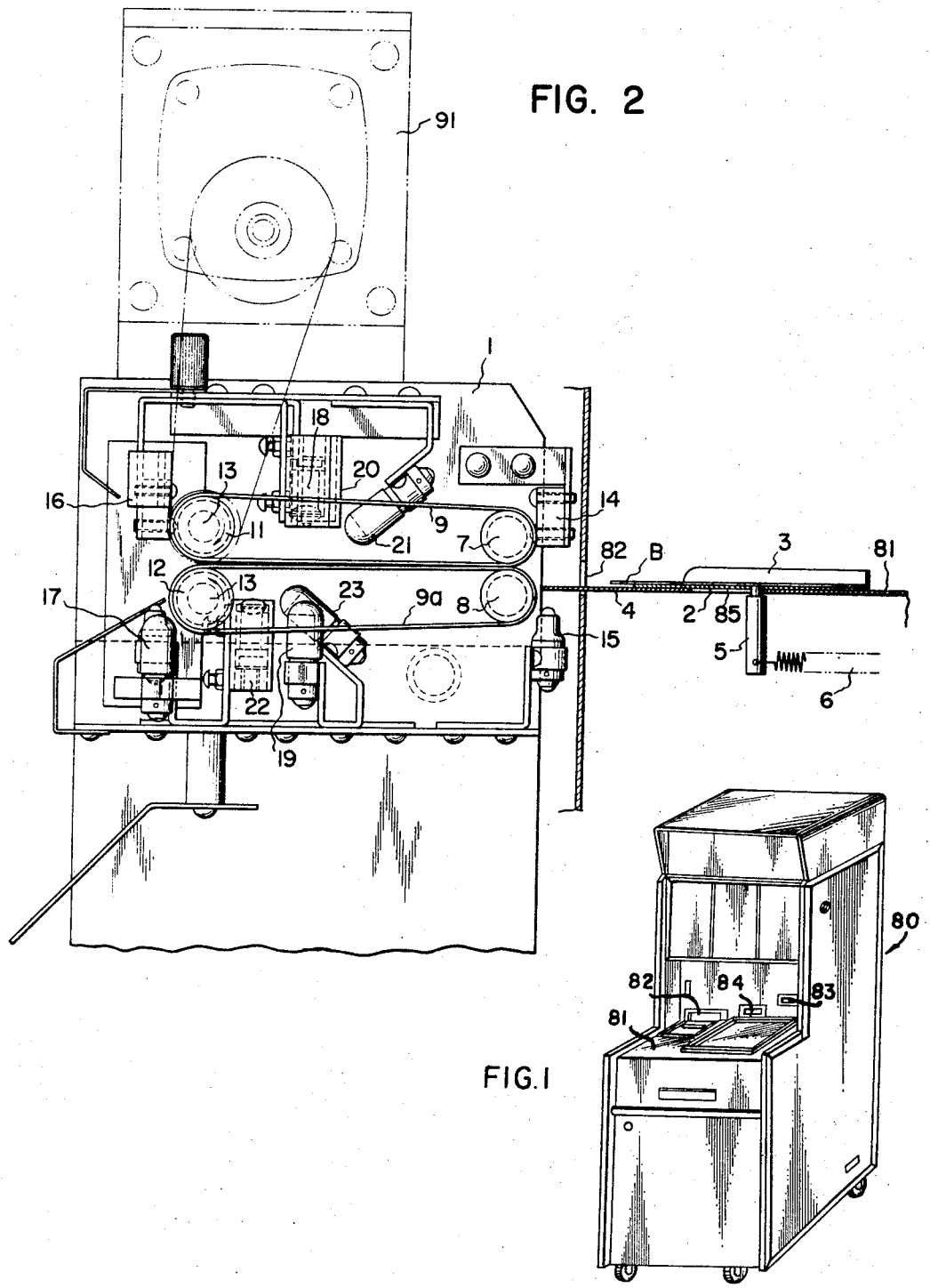

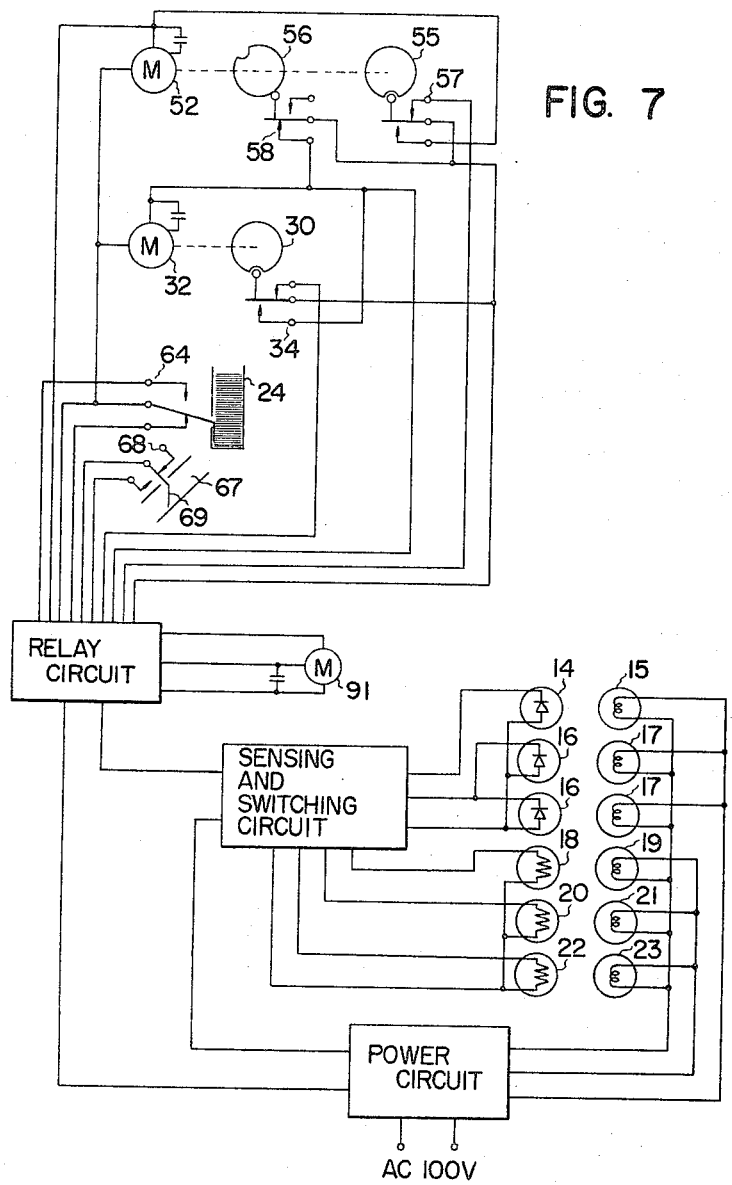

3,409,109
AUTOMATIC DOCUMENT ISSUING MACHINE
Nobuhiro Iizuka, Yoshihiro Hatanaka, and Shigejiro Inoue, Himeji-shi, Japan, assignors to Kabushiki Kaisha Kokuei Kikai Seisakusho, Hyogo-ken, and Kabushiki Kaisha Heiwa Sogo Ginko, Tokyo-to, Japan
Filed Apr. 3, 1967, Ser. No. 628,130
Claims priority, application Japan, Apr. 6, 1966, 41/21,631
8 Claims. (Cl. 194—4)

ABSTRACT OF THE DISCLOSURE

A currency discriminating mechanism having an endless belt device for receiving and holding a currency bill inserted into the machine and a number of photoconductive elements with respective light sources for examining the bill and generating a recognition signal or negation signal depending on whether or not the bill is properly genuine is combined, within a single cabinet, with a device for receiving a paper slip inserted into the machine and generating a receipt signal and a mechanism which issues a document in response to each recognition signal and a corresponding receipt signal, each paper slip and document being automatically printed at the time of operation with information such as dates, and all operations being controlled automatically through a control system.

---

This invention relates to machines for issuing documents such as bond coupons, certificates of deposit, checks, and the like. More particularly, the invention concerns a new automatic document issuing machine which issues a document when a specified item of currency and a subscription or application slip are inserted into the machine.

It is an object of the present invention to provide a document issuing machine capable of operating automatically, when a customer such as a depositor, himself, inserts paper currency of a specific monetary value and a corresponding paper slip into the machine, to issue in a simple yet reliable manner a document such as a certificate of deposit (hereinafter referred to simply as "document") corresponding to the monetary value.

Another object of the invention is to provide a document issuing machine of the above stated character which is fully automatic in operation and does not need the constant presence of an attendant.

Still another object of the invention is to provide, in a machine of the above stated character, a currency discriminating mechanism capable of accurately determining the validity or proper genuineness of each item of currency inserted thereinto.

A further object of the invention is to provide, in a machine of the above stated character, means to print automatically information such as dates on each paper slip and corresponding document issued.

According to the present invention, briefly summarized, there is provided a document issuing machine characterized by the combination of a mechanism for automatically discriminating specific items of currency and generating a recognition signal upon recognizing the validity of each of the items of currency and a negation signal upon not recognizing the validity, a device for receiving a paper slip corresponding to each item of currency and generating a receipt signal for verification of receipt of the slip, and a third mechanism for automatically operating in response to the combination of each recognition signal and the corresponding receipt signal to issue a document.

The nature, principle, and details of the invention, as well as the utility thereof, will more clearly be apparent from the following detailed description with respect to a preferred embodiment of the invention when read in conjunction with the accompanying drawings, in which like parts are designated by like reference numerals and characters.

In the drawings:

FIG. 1 is a general perspective view of the front exterior of a document issuing machine constituting an embodiment of the invention, showing the front, right side, and top thereof;

FIG. 2 is a side elevational view showing the paper money discrimination mechanism of the machine shown in FIG. 1;

FIG. 7 is an electrical block diagram for a description of the electrical system and operation of the machine according to the invention.

Figure 3:
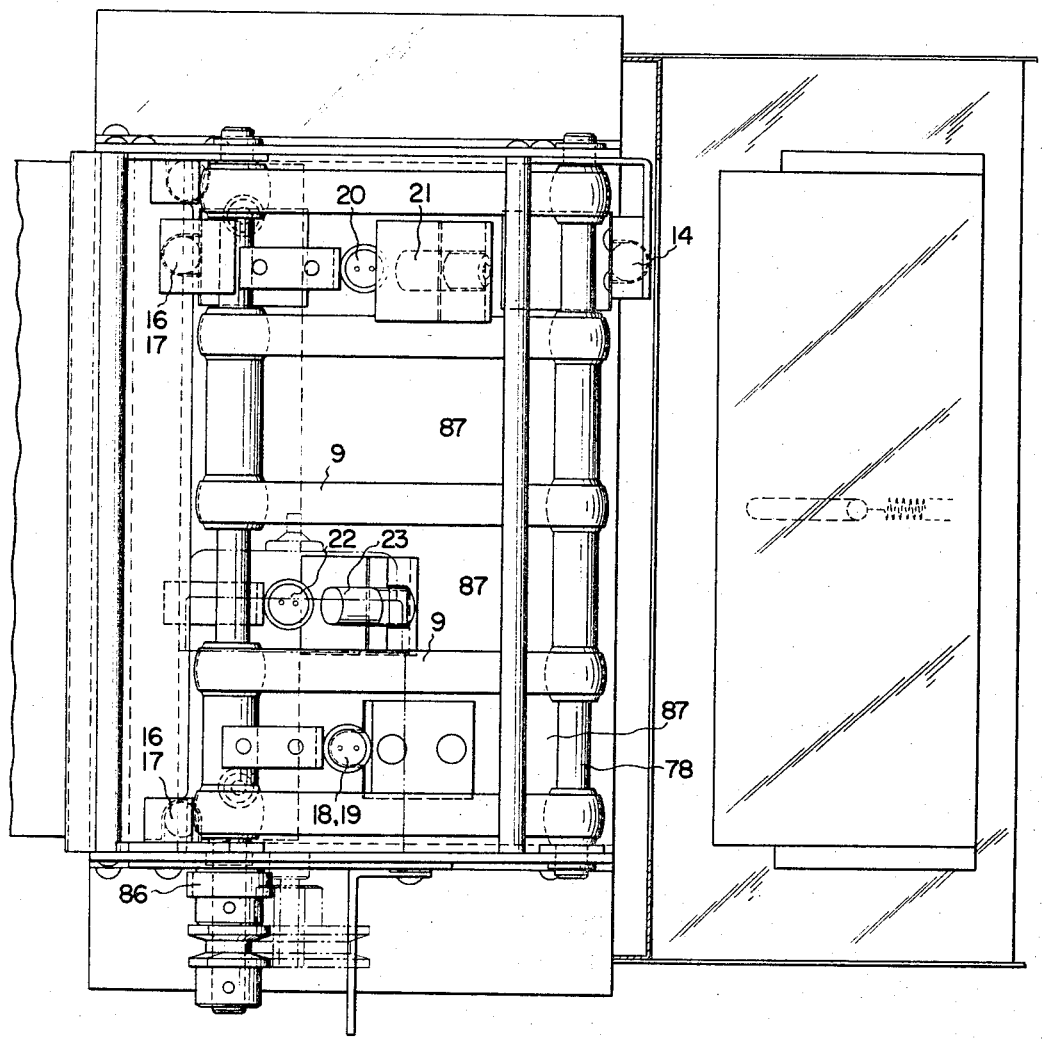
FIG. 3 is a plan view of the mechanism shown in FIG. 2.

Throughout the following description directions such as "front," "rear," and "forward," unless otherwise specified, refer to those directions as viewed by a user facing the front of the machine, that is, the outside surface of the front panel containing currency and slip insertion slots.

Referring to FIG. 1, the example shown therein of the document issuing machine according to the invention has an outer cabinet 80 of stepped shape with a front apron part having a level desktop-like platform 81 for carrying out manual operation procedures thereon and with a vertically rising part therebehind. The vertically rising part has a front panel provided with a paper bill insertion slot 82, a slot 83 for insertion of subscription or application slips, and a slot 84 for discharging documents and subscription or application blank slips (hereinafter referred to as "slips").

The machine has a paper money discriminating mechanism provided, as shown in FIGS. 2 and 3, with a horizontally disposed paper sheet feeding plate 2 which can be manually caused to undergo horizontal reciprocation, advancing to and retracting from the paper money insertion slot 82 in the front panel supported by the machine frame 1. The paper sheet feeding plate 2 is encompassed about its rectangular periphery, except its side nearest the insertion slot 82, by a low raised ridge or rim 3.

The feeding plate 2 undergoes reciprocating sliding motion on a base plate 4 constituting a part of the platform 81 and having a guide slot 85 aligned in the direction of motion of the feeding plate 2. A vertical guide bar 5 is fixed at its upper end to the lower surface of the feeding plate 2 and is passed downward through and engaged with the guide slot 85. The free end of a tension coil spring 6 for return actuation is fixed to the lower end of the guide bar 5, and the other end of the spring 6 is anchored to a part of the machine frame 1.

On the inner side of the paper money insertion slot 82, at a short distance therefrom, there are provided a pair of opposed upper and lower rollers 7 and 8 supported by the machine frame 1 in a manner to permit their rotation about horizontal parallel axes which are perpendicular to the direction of motion of the feeding plate 2. Further to the rear of the machine, there are provided another pair of horizontal, opposed upper and lower rollers 11 and 12 to operate interrelatedly with the rollers 7 and 8. The upper rollers 7 and 11 support a plurality of narrow bands of a material such as rubber stretched therearound and disposed parallelly in spaced apart arrangement to constitute a plurality of endless belts 9 as shown in FIG. 3. Similarly, the lower surface rollers 8 and 12 support similarly constituted endless belts 9a respectively below and in contact with the upper endless belts 9. The mutually facing surfaces of respective belts 9 and 9a are in contact.

The insertion slot 82 or the plane of entrance between the rollers 7 and 8 on the feeding side is slightly higher than the position of the feeding plate 2 at the feeding time thereof. The rollers 11 and 12 on the rear side are synchronously coupled to rotate in mutually opposite directions by intermeshed gears 86, 86 fixed to the left-hand end parts of the shafts 13, 13 of the rollers 11 and 12, and the shaft 13 of the roller 11 is driven by a reversible motor 91 through a pulley and belt mechanism.

At a position above the horizontal plane between the front rollers 7 and 8 and slightly forward of the roller 7, there is provided a photoconductive element 14, and, at a position vertically below the element 14 and below the horizontal plane between the rollers 7 and 8, there is provided a lamp 15 for projecting a beam of light to the photoconductive element 14.

At positions slightly to the rear of the rear rollers 11 and 12 and respectively above and below the horizontal plane between the rollers 11 and 12, there are provided two photoconductive elements 16 respectively near the left and right ends of the rollers 11 and 12 and two corresponding lamps 17 disposed vertically below their respective photoconductive elements 16.

Within a space 87 between the side edges of adjacent pairs of continuous belts 9 and 9a and above the contact plane between the belts 9 and 9a, there is mounted a photoconductive element 18, and vertically therebelow and below the belt contact plane, there is mounted a corresponding lamp 19 for projecting transmitted light to the photoconductive element 18 as described hereinafter more fully. Furthermore, within another space 87 and above the belt contact plane, there are mounted a lamp 21 for projecting light toward the belt contact plane and a corresponding photoconductive element 20 for receiving reflected light resulting from reflection by paper money of light projected from the lamp 21. Within still another space 87 and below the belt contact plane, there are mounted a photoconductive element 22 and a corresponding lamp 23 for projecting light to be reflected and then received by the element 22.

The above mentioned photoconductive elements 14, 16, 18, 20, and 22 are of known type depending on photoconductors such as phototransistors or cadmium sulphide.

The paper money discriminating mechanism of the above described composition and arrangement operates in the following manner. A paper money bill B is first placed on the paper money feeding plate 2, which is then manually pushed toward the insertion slot 82 by overcoming the force of the spring 6, the feeding plate 2 being guided by the sliding movement of the guide bar 5 along the slot 85.

The dimensions and positions of the parts of the aforementioned rim 3 bounding three sides of the feeding plate 2 are so selected that when the bill B is placed in position on the plate 2 and against the rim 3, the free edge of the bill nearest the insertion slot extends slightly beyond the leading edge of the plate 2. Consequently, when the plate 2 approaches the rollers 7 and 8, the free edge of the bill B enters the space between the photoconductive element 14 and the lamp 15, and the quantity of light being received by the photoconductive element 14 changes, whereby the entrance of the bill B is detected.

The photoconductive element 14 thereupon causes a relay circuit to operate and close the forward rotation circuit of the aforementioned motor 91, which thereby rotates in its forward direction. More specifically, the photoconductive element is connected in the electrical system of the machine as indicated schematically in FIG. 7, and when the quantity of light it is receiving from the lamp 15 changes, the resistance of the element 14 increases to cause a signal to be generated by a sensing and switching circuit S. The signal then enters a relay circuit R to energize a relay coil for forward rotation provided within the relay circuit R, and the corresponding contact operates, whereby the motor 91 rotates in its forward direction to rotate the upper rolls 11 and 7 and the lower rolls 12 and 8 respectively in clockwise and counterclockwise directions.

As mentioned hereinbefore, the gap between the front opposed rollers 7 and 8 is positioned slightly above the level of the feeding plate 2 at the time of its feeding motion. For this reason, the bill B is positively fed into this gap without catching or sticking even when it is wrinkled. Since the upper and lower belts 9 and 9a are rotating in the directions of the arrows shown in FIG. 2, the bill B is clamped between these belts 9 and 9a and conveyed toward the rear of the machine.

When the bill B thus conveyed reaches a position where the leading edge thereof is interposed between the photoconductive element 16 and the lamp 17, the bill B causes the quantity of light received by the photoconductive element 16 to change, whereby the arrival of the bill B is detected, and this detection causes a second relay circuit to operate and render the first mentioned relay circuit inoperative. Consequently, the motor 91 and the belts 9 and 9a driven thereby stop, and the bill B is retained at a predetermined rear position.

More specifically, the photoconductive element 16 is connected in the electrical system as indicated in FIG. 7, and when the quantity of light it is receiving changes, its resistance increases to cause a signal to be generated by the sensing and switching circuit S. This signal then enters the relay circuit R to cause a relay circuit provided within the relay circuit R to operate and cut off the power supply to the motor 91, which thereby stops.

Simultaneously, the bill B clamped between belts 9 and 9a and retained at the rear position as described above is automatically examined optically by the photoconductive elements 18, 20, and 22 operating in conjunction with their lamps 19, 21, and 23. More specifically, the light projected by lamp 19 from one face (the front face or reverse face) of the bill B and transmitted through the bill is received by the photoconductive element 18. The reflected light due to the projection of light by lamp 21 on the other face of the bill B is received by the photoconductive element 20. The reflected light due to the projection of the light by lamp 23 on the first face of the bill B is received by the photoconductive element 22.

These photoconductive elements 18, 20, and 22 are connected by way of resistances so as to form a bridge circuit within the sensing and switching circuit S shown in FIG. 7. The photoconductive elements 18, 20, and 22, upon receiving transmitted light and reflected light respectively from lamps 19, 21, and 23 as described above operate in response to the quantities of light respectively received in accordance with significant and identifying features of the bill B such as the degrees of darkness or lightness of the front and reverse faces, the thickness of the paper sheet, and the material properties.

The bridge circuit of the photoconductive elements 18, 20, and 22 is so preadjusted that it is maintained in equilibrium in the case when the paper money bill B is properly genuine or valid. Accordingly, the bridge circuit generates a recognition signal whereby the contacts for forward and reverse rotation of the motor 91 are prevented from closing. Therefore, the motor 91 remains inoperative, and, accordingly, the bill B is retained in the rear position.

In the case when the bill B is not proper, and the bridge circuit is not maintained in equilibrium, a reverse rotation circuit of the motor 91 is closed within the relay circuit R shown in FIG. 7 by the operation of a relay circuit. Accordingly, the motor 91 rotates in reverse direction to drive the belts 9 and 9a also in reverse direction, whereby the bill B is returned to the insertion slot 82 and rejected to the outside. Since the feeding plate 2 at this time has already been returned to its original position by the spring 6, and since the feeding plate is positioned slightly below the gap between the rollers 7 and 8, the bill B is returned to the outside without catching or sticking.

Figure 4:
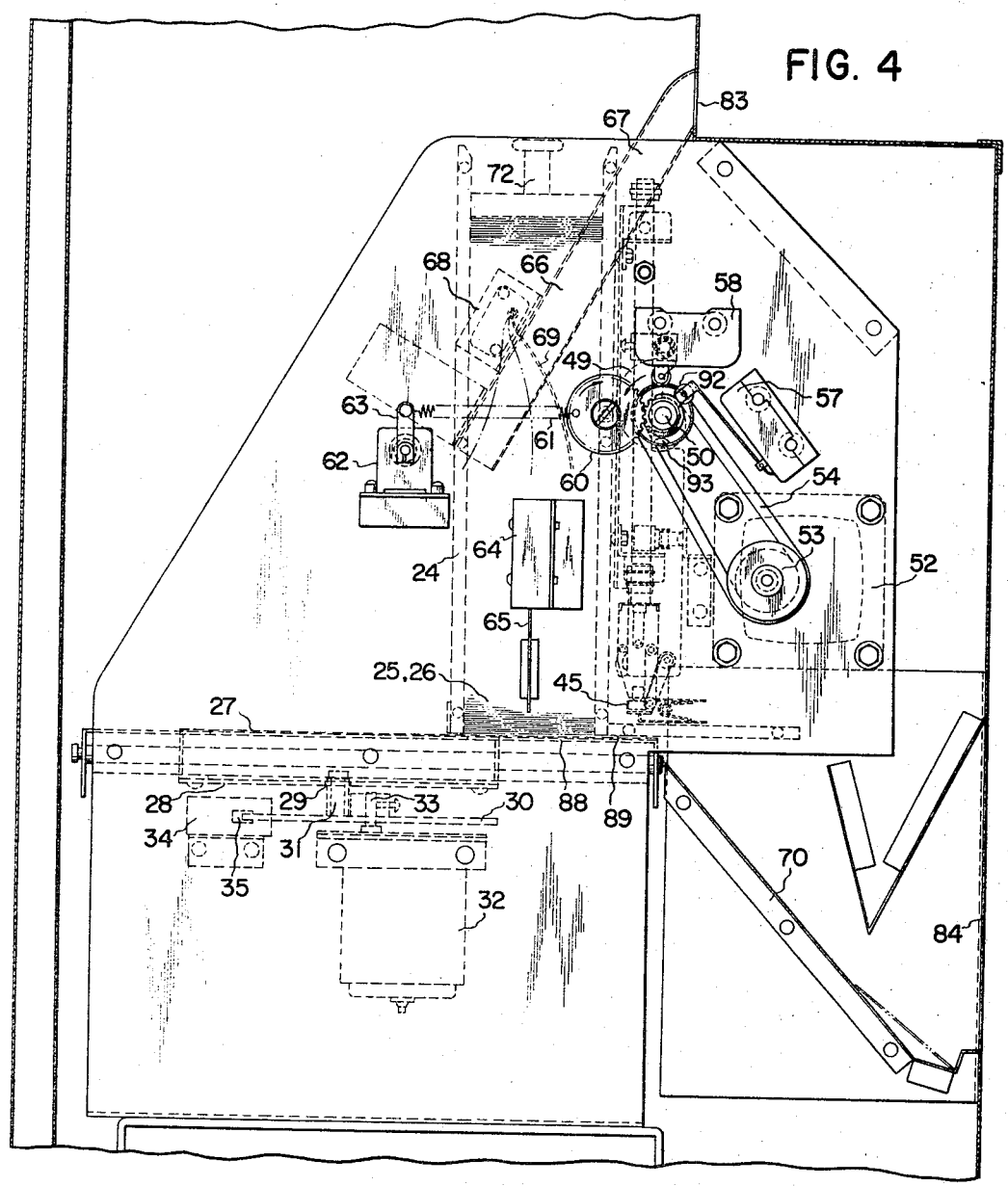
FIG. 4 is a side elevational view showing the document discharging mechanism of the machine.
Figure 5:
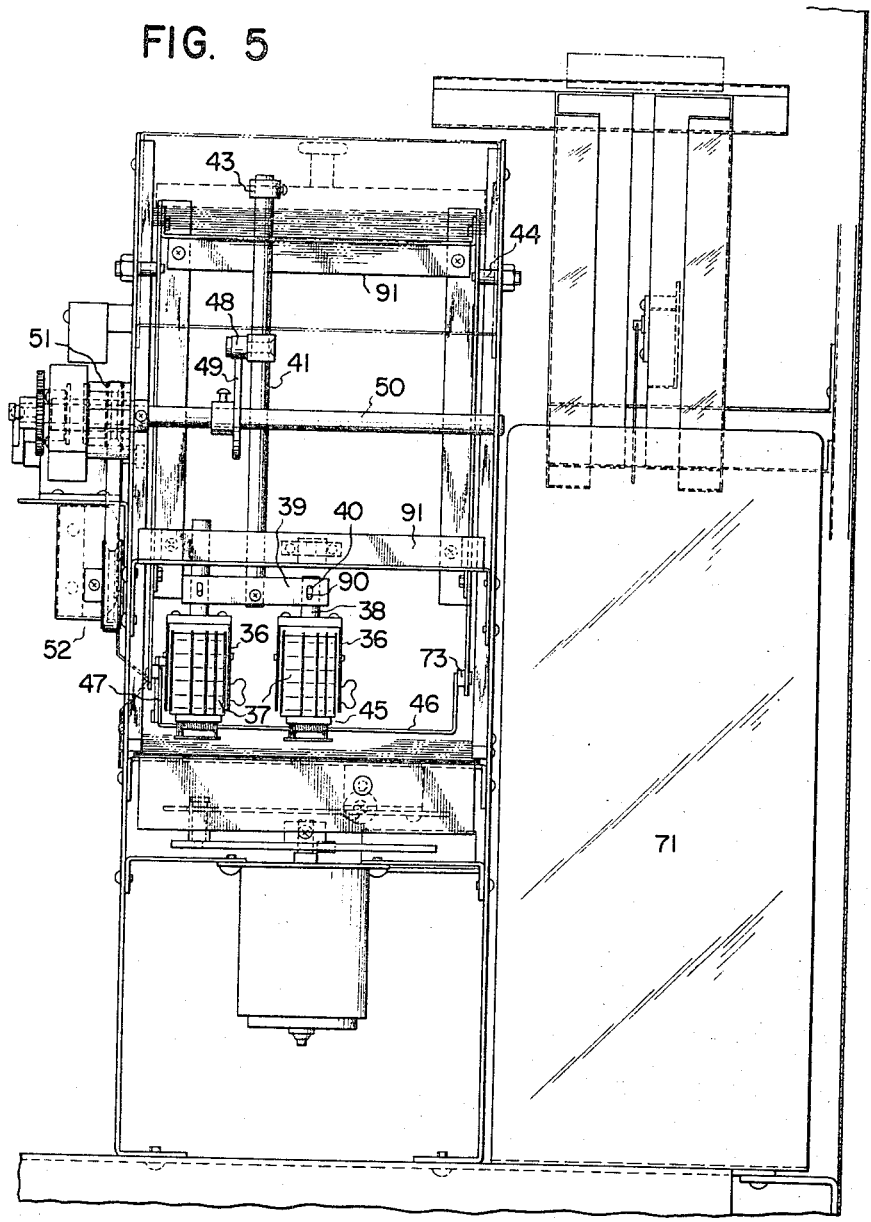
FIG. 5 is a front elevational view of the mechanism shown in FIG. 4.
Figure 6:
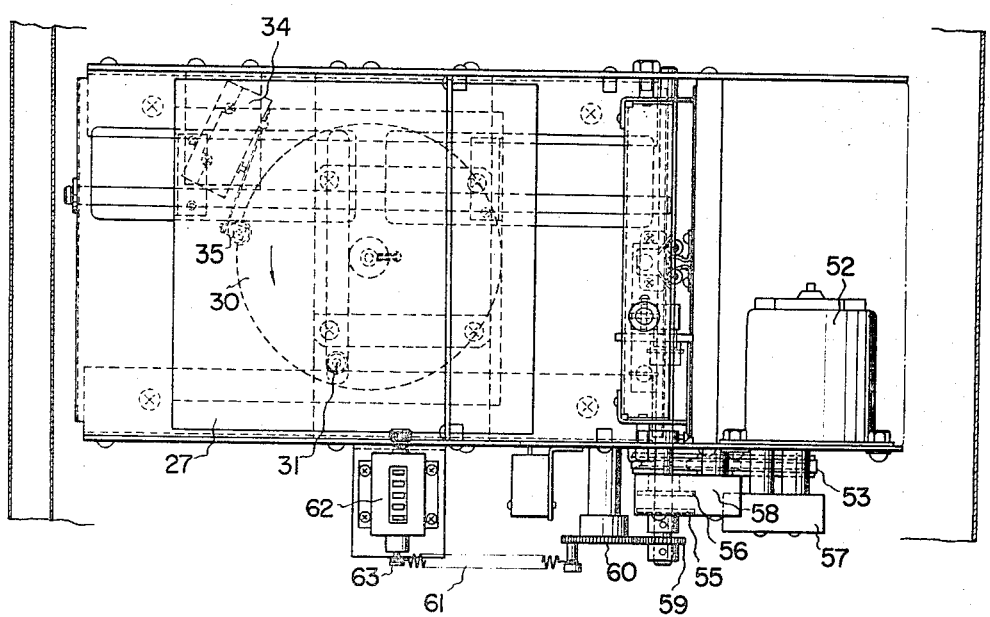
FIG. 6 is a plan view of the mechanism shown in FIGS. 4 and 5.

The machine according to the invention further has a mechanism for supplying blank slips and discharging documents. Referring to FIGS. 4, 5, and 6, this mechanism includes a magazine 24 for containing documents in which blank slips 25 and documents 26 are stacked alternately in laminate arrangement. The magazine 24 has an open bottom 88.

On a horizontal level immediately below the open bottom 88 of the magazine 24, there is provided a push plate 27 for undergoing horizontal reciprocation so that its leading edge (front edge) traverses the open bottom 88. The push plate is supported on a horizontally movable push frame 28 having on its lower side a long groove 29 in the horizontal direction perpendicular to the reciprocation direction of the push plate 17. The groove 29 is engaged by an actuating bar 31 fixed to and extending vertically upward from the upper surface of a horizontal cam plate 30 at a position which is eccentrically offset from the axis of rotation of the cam plate 30. The cam plate 30 is fixed to the shaft 33 of a vertical motor 32, and a cam follower 35 of a holding switch 34 of the motor 32 is in contact with the peripheral surface of the cam plate 30.

Slightly forward of and above the outlet side (front side) of the open bottom 88 of the magazine 24 for documents and blank slips, there are mounted printing mechanisms 36 which are date stamps 37, 37 of known type and have upper bars 38 whose pins 90 are respectively engaged with slots 40 in a support bar 39. The support bar 39 is connected to the lower end of a vertical reciprocating rod 41 which is slidably engaged for vertical motion with cross beams 91 of a swinging frame 42 and is provided at its upper end with a stop member 43 for stop engagement with the upper part of the swinging frame 42. The swinging frame 42 is pivoted in a freely swingable manner by support pins 44 on the aforementioned machine frame 1.

As shown in FIG. 5, ink pads 45, 45 are provided below the date stamps 37, 37 and are fixed to a swinging member 46 pivoted by pins 73 on the swinging frame 42. The other end of the swinging member 46 is formed as a bent bar 47 which is pivoted on one date stamp 37.

The vertical reciprocating rod 41 is provided at an intermediate part thereof with a follower member 48 for engagement with a cam 49, which is fixed to a horizontal shaft 50 rotatably supported by the machine frame 1. A pulley 51 is fixed to one end of the shaft 50, which is coupled by driving belt 54 to a pulley 53 driven by a motor 52 mounted on the machine frame 1.

Cams 55 and 56 with cutouts 92 and 93 are also fixed to the end of the shaft 50, the cam 55 operating to open and close a drive holding switch 57 of the motor 52, and the cam 56 operating to open and close a drive switch 58 of the aforementioned motor 32. Furthermore, a gear 59 is also fixed to the shaft 50 and meshed with a gear 60 by which a speed reduction of 1:2 is obtained, the gear 60 being rotatably supported on the machine frame 1. One end of a tensioned coil spring 61 is pivotally connected to an off-center point on the gear 60, while the other end is pivotally connected to the free end of the operating lever 63 of a counter 62.

At the lower part of the magazine 24 for documents and blank slips, there is installed the operating member 65 of a monitoring switch 64 for detecting deficiency in the number of documents and blank slips remaining in the magazine 24. For positive downward movement of the stacked documents and blank slips in the magazine 24, a weight 72 is placed on top of the stack.

The document issuing machine according to the invention is further provided with a mechanism for receiving and verifying filled-out slips reinserted into the machine through the aforementioned slip insertion slot 83. Leading inward from the slot 83, there is provided and inclined slip guide chute 66 having guide flanges 67, 67 along its two sides. The operating member 69 of a microswitch 68 of the aforementioned motor 52 is disposed within the guide chute 66.

The mechanism for supplying blank slips and discharging documents, the printing mechanism, and the mechanism for receiving and verifying filled-out slips of the above described composition and arrangement according to the invention operates in the following manner.

The aforementioned recognition signal signifying that the paper money bill B is properly genuine as detected by the operation of the photoconductive elements 18, 20, and 22 of the paper money discriminating mechanism causes the motor 52 to operate. Accordingly, the power produced by this motor 52 is transmitted through the pulley 53, belt 54, and pulley 51 to rotate the shaft 50, whereupon the tip of the operating member of the microswitch 57 disengages from the cutout 92 of the cam 55 fixed to the shaft 50 and rides onto the periphery of the cam 55, whereby the microswitch of the motor 52 is closed, and the shaft continues to be rotated.

Consequently, the cam 49 is rotated and presents a sudden cutout part on its periphery to the follower member 48 fixed to the vertical rod 41, which thereby drops abruptly under the force of gravity. Accordingly, this abrupt drop is transmitted through the support bar 39 to cause the date stamps 37, 37 to descend. The ink pads 45 are then rotated in the counterclockwise direction (as viewed in FIG. 4) by the action of the swinging member 46 and connecting bar 47, and a blank slip extending forward from the bottom opening 88 of the magazine 24 is thereby printed with the subscription or application date and another date such as the terminal date of a time deposit.

After completion of this printing operation, the shaft 50 continues to rotate, and the cam 48 operates to raise the date stamps 37, 37. At the same time, the cam 56 also rotates until its cutout 93 engages with the operating member of the microswitch 58, which is thereby closed, and the motor 32 rotates to drive the cam plate 30, whereby the microswitch 34 is closed, and the rotation of the motor 32 is maintained.

The rotation of the cam plate 30 and its actuating bar 31 causes the push frame 28 to move forward, and the front edge of the push plate 27 pushes the blank slip 25 printed in the above described manner forward, whereby the slip 25 descends along an inclined guide chute 70 to the slip supplying slot 84.

The push plate 27 then retracts, permitting the succeeding document sheet 26 in the magazine 24 to drop into position at the bottom opening 88 of the magazine. The push plate 27 then advances again to push this document 26 to a position directly below the printing mechanism, whereupon the cam plate 30 ceases to operate the operating member of the switch 34, and the motor 32 stops. Thus, the document 26 is then in a state of readiness for the succeeding operation.

When the aforementioned blank slip 25 is supplied through the slot 84 to outside, the subscriber fills out the spaces thereon for necessary information such as his name and address and then reinserts the slip into the insertion slot 83, whereupon the slip descends through the guide chute 66 and is received in a collecting box 71. As the slip slides down the chute 66, it pushes the operating member 69 of the switch 68 to close the switch 68.

Closure of the switch 68 produces a slip receipt signal which causes the motor 52 to rotate, and the printing mechanism 36, 36, which has been returned to its retracted position, descends again, whereupon the ink pads 45, which have been in contact with the date stamps, 37, 37, again move forward, and the above described printing operation is repeated, the document 26 thereby being similarly printed and discharged out through the slot 84.

The aforementioned sensing and switching can be preset to operate in response to the recognition signal, to the slip receipt signal, or the combination of the two signals to cause forward rotation of the motor 91 to drive the belts 9 and 9a and thereby to convey the bill B, recognized as being valid, further to a collecting means.

By the above described two operations of discharging a blank slip 25 and a corresponding document 26, the gear 60 is rotated through one revolution, and the counter 41 undergoes one counting operation. In the above described manner, discrimination of paper money bills as being properly genuine cause the successive discharges of blank slips and documents stacked in alternate layers in the magazine 24.

By the composition and arrangements of parts as described above of the document issuing machine according to the invention, it is possible to issue documents automatically in response to a recognition signal resulting from the insertion of a specified currency for payment such as that for a time deposit and in response to a receipt signal resulting from the insertion of a subscription slip or the like. Accordingly, it becomes possible for an issuing organization such as a bank to receive payments and subscriptions in a positive manner and readily effect verification without the need for the constant presence and attention to an attendant.

While the invention has been described above with respect to an example wherein blank slips and documents are stacked in alternate layers and successively discharged, it is also possible to modify the machine to contain the blank slips and documents separately in respectively different magazines. Furthermore, an alternative modification permitting the simultaneously insertion of a currency bill and a subscription slip to produce, respectively, a recognition signal and a receipt verification signal is also possible.

Accordingly, it should be understood that the foregoing disclosure relates to only an example of preferred embodiment of the invention and that it is intended to cover all changes and modifications of the example of the invention herein chosen for the purposes of the disclosure, which do not constitute departures from the spirit and scope of the invention as set forth in the appended claims.

What we claim is:

1. A document issuing machine comprising, in combination, a first powered mechanism for automatically discriminating specific items of currency fed thereinto and generating a recognition signal upon recognizing the validity of each of said items of currency, a second powered mechanism for automatically operating in response to said recognition signal to supply to the outside of the machine a blank paper slip corresponding to each of said items of currency, a third mechanism for receiving said slip reinserted into the machine and generating a receipt signal for verification of receipt of the slip, and a fourth powered mechanism operating in response to the combination of said recognition signal and said receipt signal to issue a document to the outside of the machine.

2. The document issuing machine as claimed in claim 1 in which the second mechanism for suppying blank paper slips and the fourth mechanism for issuing documents are combined in a single powered mechanism adapted to supply alternately blank paper slips and documents to the outside of the machine.

3. The document issuing machine as claimed in claim 1 in which the second mechanism for supplying blank paper slips and the fourth mechanism for issuing documents are provided with means to print information relating to and dependent upon the time of operation on each paper slip and each document at each instance of operation.

4. The document issuing machine as claimed in claim 2 in which the single powered mechanism for supplying alternately blank paper slips and documents is provided with means to print information relating to and dependent upon the time of operation on each paper slip and each document at each instance of operation.

5. A document issuing machine comprising, in combination, a first powered mechanism for automatically discriminating specific items of currency fed thereinto and generating a recognition signal upon recognizing the validity of each of the items of currency, a second mechanism for receiving paper slips fed thereinto and corresponding respectively to the items of currency and generating a receipt signal for verification of receipt of each slip; and a third powered mechanism operating in response to the combination of each recognition signal and a corresponding receipt signal to issue a document to the outside of the machine, each item of currency and the corresponding paper slip being fed into the respective first and second mechanisms at approximately the same time.

6. The document issuing machine as claimed in claim 1 in which the first mechanism comprises: a reversible endless belt device for automatic reception and accurate holding of each item of currency in a consistant predetermined position for discrimination; a plurality of light sources for projecting beams of light to respective parts of the item of currency thus held; a plurality of photoconductive elements corresponding respectively to the light sources and positioned to receive light transmitted through and reflected from the item of currency and generate respective electrical signals corresponding to the light thus received; an electrical discriminating circuit for operating in response to said electrical signals to generate the recognition signal upon recognizing the validity of the item of currency and to generate a negation signal upon not recognizing said validity; a detection device for detecting the initial entrance of the item of currency into the machine and generating a starting signal; and a motor-powered driving means operating in response to said starting signal to drive the endless belt device for said reception and holding of each item of currency and further operating in response to said recognition signal to cause the endless belt device to discharge said item into a collecting means and in response to said negation signal to cause the endless belt device to reject said item to the outside of the machine.

7. The document issuing machine as claimed in claim 2 in which the first mechanism comprises: a reversible endless belt device for automatic reception and accurate holding of each item of currency in a consistent predetermined position for discrimination; a plurality of light sources for projecting beams of light to respective parts of the item of currency thus held; a plurality of photoconductive elements corresponding respectively to the light sources and positioned to receive light transmitted through and reflected from the item of currency and generate respective electrical signals corresponding to the light thus received; an electrical discriminating circuit for operating in response to said electrical signals to generate the recognition signal upon recognizing the validity of the item of currency and to generate a negation signal upon not recognizing said validity; a detection device for detecting the initial entrance of the item of currency into the machine and generating a starting signal; and a motor-powered driving means operating in response to said starting signal to drive the endless belt device for said reception and holding of each item of currency and further operating in response to said recognition signal to cause the endless belt device to discharge said item into a collecting means and in response to said negation signal to cause the endless belt device to reject said item to the outside of the machine.

8. A document issuing machine comprising, in combination, a first mechanism for discriminating specific item of currency fed thereinto and generating a recognition signal upon recognizing the validity of each of the items of currency; a second mechanism for receiving paper slips corresponding respectively to the items of currency and generating a receipt signal for varifying receipt of each of said slips; and a third mechanism operating in response to the combination of a recognition signal and a receipt signal to issue a document to the outside of the machine, said first mechanism being constituted by a reversible endless belt device for automatic reception and accurate holding of each item of currency in a consistent predetermined position for discrimination, a plurality of photoconductive elements corresponding to respective parts of the item of currency thus held, a plurality of photoconductive elements corresponding respectively to the light sources and positioned to receive light transmitted through and reflected from the item of currency and generate respective electrical signals corresponding to the light thus received, an electrical discriminating circuit for operating in response to said electrical signals to generate the recognition signal upon recognizing the validity of the item of currency and to generate a negation signal upon not recognizing said validity, a detection device for detecting the initial entrance of the item, of currency into the machine and generating a starting signal, and a motor-powered driving means operating in response to said starting signal to drive the endless belt device for said reception and holding of each item of currency and further operating in response to said recognition signal to cause the endless belt device to discharge said item into a collecting means and in response to said negation signal to cause the endless belt device to reject said item to the outside of the machine.

References Cited

UNITED STATES PATENTS 2,936,684  5/1960  Simjian _____ 194—4 X

STANLEY H. TOLLBERG, *Primary Examiner.*